Patented Nov. 5, 1940

2,220,818

UNITED STATES PATENT OFFICE 2,220,818

PROCESS FOR THE REMOVAL AND RECOVERY OF FLUORIDES FROM TRIALKALI PHOSPHATES

Fredrick C. Jelen, Anniston, Ala., assignor to Monsanto Chemical Company, a corporation of Delaware No Drawing. Application February 23, 1939, Serial No. 257,968

6 Claims. (Cl. 23—107)

This invention relates to the removal and recovery of fluorine compounds such as fluorides from alkaline phosphates.

In the manufacture of alkaline phosphates from phosphate rock, the products obtained are in most cases combined or mixed with fluorine compounds particularly fluorides. For the further processing or sale of such phosphate it is, in most cases desirable that the fluorides be either completely removed or at least considerably reduced. It is an object of the present invention to provide a simple process for the purification of alkaline phosphates by removal of associated fluorine. It is a further object of this process to recover such fluorine compounds directly and in a substantially pure form.

My process will be explained by means of the following example:

Example

A sample of fluoride trisodium phosphate hydrate containing 20% $P_2O_5$ and 2.45% F as NaF was dissolved by heating in its own water of crystallization and then heated to a temperature of 120° C. Pressure was applied to the solution in order to prevent boiling. The solution was then filtered while at this elevated temperature and thus separated into a residue and a filtrate. The residue after drying contained 37.5% $Na_3PO_4$ and 62.5% NaF. The residue may be recrystallized for recovery of pure sodium fluoride. The solution was crystallized by cooling without the addition of more water and yielded a trisodium phosphate containing 47.3% $Na_3PO_4$; 0.6% NaF and 52.1% $H_2O$. The process as illustrated by this example therefore enriched the residue from an original molal ratio of NaF to $Na_3PO_4$ of 0.46 in the fluoride trisodium phosphate to a molal ratio of NaF to $Na_3PO_3$ in the residue of 6.50.

For the purpose of the present process the concentration of the salts is critical and it is preferred that the amount of water used be maintained within an upper limit of 20 mols of water to 1 mol of $Na_3PO_4$ and a lower limit of 5 mols of water to 1 mol of $Na_3PO_4$.

The efficiency of the separation at 120° is greatest when the ratio of water to $Na_3PO_4$ is about 10 or 11 mols of water to 1 mol of $Na_3PO_4$. When the molal ratio of water to $Na_3PO_4$ is as great as 20 to 1 the process is operable, however the amount of fluoride in the filtrate is greater than with lesser amounts of water.

When the molal ratio of water to $Na_3PO_4$ in the solution to be filtered is as low as 5 to 1 the process is still operable, however the fluoride residue is contaminated with $Na_3PO_4$.

In general the phenomena which I have discovered takes place beginning at about 100° C. as the lower temperature limit. There appears to be no upper temperature limitation upon the phenomena itself and hence the upper temperature limit follows from practical considerations only. The practical considerations are that the water in the concentrations stated, must be in the liquid phase. In order to insure that this is the case, pressure may be applied to the solution to prevent evaporation of water, and hence to maintain the concentrations within the limits stated above. For ordinary purposes temperatures between 100° and 150° C. are suitable.

The compositions containing sodium fluoride and trisodium phosphate which may be treated by my herein described process may exist originally as the so-called double salts of trisodium phosphate and sodium fluoride or may be obtained as a solution of these salts. The following trisodium phosphate sodium fluoride double salts are known and described in the literature:

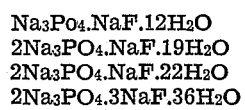

$Na_3PO_4.NaF.12H_2O$
$2Na_3PO_4.NaF.19H_2O$
$2Na_3PO_4.NaF.22H_2O$
$2Na_3PO_4.3NaF.36H_2O$

The above double salts may be treated by my herein described process and the sodium fluoride may be separated therefrom in a substantially pure form.

In many cases the trisodium phosphate-sodium fluoride compound may not have been separated from solution as a crystalline compound but the constituents thereof may be present in solution, not only in the proportions given above but in other proportions. Irrespective of whether the trisodium phosphate-sodium fluoride composition exists as a true compound or a mixture or merely in solution, the process herein described may be applied thereto and the trisodium phosphate separated from the sodium fluoride.

The process herein described and claimed may be carried out in the presence of small amounts of other salts or compounds. There may for example be present small amounts of caustic soda, NaOH, or sodium carbonate, $Na_2CO_3$ without effect upon the process.

Having now described my invention and the manner of carrying it out I desire that it not be limited except as indicated by the prior art or as particularly defined by the claims.

What I claims is:

1. The process for removing sodium fluoride from trisodium phosphate comprising forming a solution containing sodium fluoride and trisodium phosphate adjusting the concentration of said solution to contain between 20 mols of $H_2O$ and 5 mols of $H_2O$ to 1 mol of $Na_3PO_4$ and then filtering the solution at temperatures above 100° C. to remove crystallized sodium fluoride, NaF, therefrom.

2. The process for separating sodium fluoride and trisodium phosphate comprising adjusting the concentration of a solution containing sodium fluoride and trisodium phosphate so that it will contain between 20 mols and 5 mols of $H_2O$ per mol of $Na_3PO_4$ and then filtering the said solution at temperatures between 100° C. and 150° C. and thereby removing crystallized sodium fluoride, NaF, therefrom.

3. The process for separating sodium fluoride and trisodium phosphate comprising adjusting the concentration of a solution containing both sodium fluoride and trisodium phosphate so that the solution will contain between 20 and 5 mols of $H_2O$ per mol of $Na_3PO_4$ and then filtering the solution at temperatures between 100° C. and 150° C. while under superatmospheric pressure and thereby removing crystallized sodium fluoride therefrom.

4. The process for preparing trisodium phosphate low in fluoride from trisodium phosphate containing appreciable amounts thereof comprising preparing a solution of said fluoride trisodium phosphate, said solution containing between 20 and 5 mols of $H_2O$ per mol of $Na_3PO_4$, filtering said solution to remove sodium fluoride, NaF while at a temperature above 100° C. and crystallizing trisodium phosphate from the filtrate.

5. The process for separating sodium fluoride from trisodium phosphate comprising preparing a solution containing said salts so as to have a concentration of about 10 to 11 mols of water to 1 mol of $Na_3PO_4$, and then filtering the solution at a temperature above about 100° C.

6. The process for separating sodium fluoride from trisodium phosphate, comprising preparing a solution containing said salts so as to have a concentration in the neighborhood of 10 to 11 mols of water to 1 mol of $Na_3PO_4$, and then filtering the solution at a temperature above 100° C. while said solution is maintained under superatmospheric pressure.

FREDRICK C. JELEN.